United States Patent
Fernandes (10) Patent No.: US 10,452,115 B2
(45) Date of Patent: Oct. 22, 2019

(54) REMOVABLE POWER LOSS PROTECTION MODULE

(71) Applicant: Seagate Technology LLC, Cupertino, CA (US)

(72) Inventor: Ashley Caciano Fernandes, Goa (IN)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 139 days.

(21) Appl. No.: 15/335,270

(22) Filed: Oct. 26, 2016

(65) Prior Publication Data

US 2018/0113499 A1 Apr. 26, 2018

(51) Int. Cl.
*G06F 1/3212* (2019.01)
*G06F 13/40* (2006.01)
*G06F 13/42* (2006.01)
*G06F 1/3234* (2019.01)

(52) U.S. Cl.
CPC .......... *G06F 1/3212* (2013.01); *G06F 1/3253* (2013.01); *G06F 13/4068* (2013.01); *G06F 13/4282* (2013.01)

(58) Field of Classification Search
None
See application file for complete search history.

(56) References Cited

U.S. PATENT DOCUMENTS

| | | | |
|---|---|---|---|
| 7,954,006 B1 * | 5/2011 | Mangipudi | G06F 1/30 713/340 |
| 8,289,801 B2 | 10/2012 | Smith et al. | |
| 8,527,693 B2 | 9/2013 | Flynn et al. | |
| 8,850,091 B1 * | 9/2014 | Karamcheti | G06F 12/0246 710/62 |
| 8,880,765 B2 * | 11/2014 | Melvin, Jr. | H02J 13/0075 340/870.03 |
| 9,143,005 B1 * | 9/2015 | Laird | H02J 9/00 |
| 9,619,848 B2 * | 4/2017 | de Castro | G06Q 50/06 |
| 2004/0156151 A1 * | 8/2004 | Morrow | G06F 1/266 361/18 |
| 2004/0212941 A1 * | 10/2004 | Haas | G06F 1/3203 361/90 |
| 2005/0180079 A1 * | 8/2005 | Joseph Gaudreau | G06F 1/26 361/104 |
| 2010/0138684 A1 * | 6/2010 | Kim | G06F 1/3225 713/601 |
| 2010/0153621 A1 * | 6/2010 | Kreiner | G06F 3/0607 711/103 |
| 2015/0236507 A1 * | 8/2015 | Burant | H02H 3/105 307/23 |

(Continued)

*Primary Examiner* — Henry Tsai
*Assistant Examiner* — Christopher A Bartels
(74) *Attorney, Agent, or Firm* — Holzer Patel Drennan (57) ABSTRACT

A removable power loss protection module interfaces with a carrier board via a bus connection. The removable power loss protection module includes energy storage components that are charged with a voltage received from a host computing system via the carrier board and/or via the host computing system's power supply. If the carrier board experiences a power loss, the removable power loss protection module discharges the energy stored in the energy storage components to the carrier board to allow the carrier board to backup any data that would have been lost. In an implementation, the removable power loss protection module may support multiple carrier boards.

20 Claims, 5 Drawing Sheets

(56) References Cited

U.S. PATENT DOCUMENTS

2016/0098328 A1\* 4/2016 Lucas .................. G06F 1/26
                                                714/14
2016/0139642 A1\* 5/2016 Hijazi .................. G06F 1/26
                                                361/679.31
2017/0315873 A1\* 11/2017 Alcorn ................ G06F 11/1441

\* cited by examiner

REMOVABLE POWER LOSS PROTECTION MODULE

BACKGROUND

Carrier boards may be incorporated into a host computing system environment, such as carrier "add-on" boards designed to add features to, or expand features present in, the host computing system. If the host computing system loses power unexpectedly, the incorporated carrier boards likely will lose power too, unless there is a back-up power solution. Unplanned power loss to carrier boards may cause unintended and/or detrimental effects to the host computing system due to interruption of the tasks performed by the carrier board. On carrier boards incorporating data storage media, unplanned power failures may cause data loss.

SUMMARY

A removable power loss protection module for use with a carrier board integrated into a host computing system includes energy storage components and control circuitry to provide back-up power to the carrier board in the case of an unexpected power loss. The removable power loss protection module may interface with the carrier board via a bus connector. The bus connector communicates control signals between the carrier board and the removable power loss protection module. The bus connector may also communicate a voltage from the carrier board to the removable power loss protection module to charge the energy storage components. Alternatively, or additionally, the removable power loss protection module may receive a voltage from the power supply of the host computing system to charge the energy storage components. Upon power loss, the carrier board may continue to operate using power stored in the energy storage components of the removable power loss protection module until the data has been secured. In the case of a carrier board with data storage media, the carrier board may operate in an "enterprise data" mode when the carrier board detects that a removable power loss protection module is available, such that data will be protected in the event of a host computing system power loss. In some cases, it may be necessary for the carrier board to reboot and/or download executable code from the removable power loss protection module when the removable power loss protection module becomes available to switch the carrier board into an enterprise data mode. A carrier board with data storage media may secure the data in the event of a power loss by the host computing system by, for example, completing write operations that are in progress at the time of a power loss event, writing data cached in a volatile memory read cache to non-volatile memory, completing data migrations, etc. In an implementation, a removable power loss module may provide back-up power to multiple carrier boards via external cables or via an expansion bus connector on the host computing system in the event of a power loss.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTIONS

The present disclosure includes removable power loss protection modules for providing back-up power to removable carrier boards in a host computing system in the event of an unexpected power failure. One type of removable carrier board is a circuit board containing electronics configured for use with a host computing system via an expansion bus. A carrier board may generally contain various types of circuitry for use with the computer, such as audio, video, data storage, network communications, external input/output modules, etc. A carrier board may include bus connectors to interface with the removable power loss protection modules.

Figure 1:
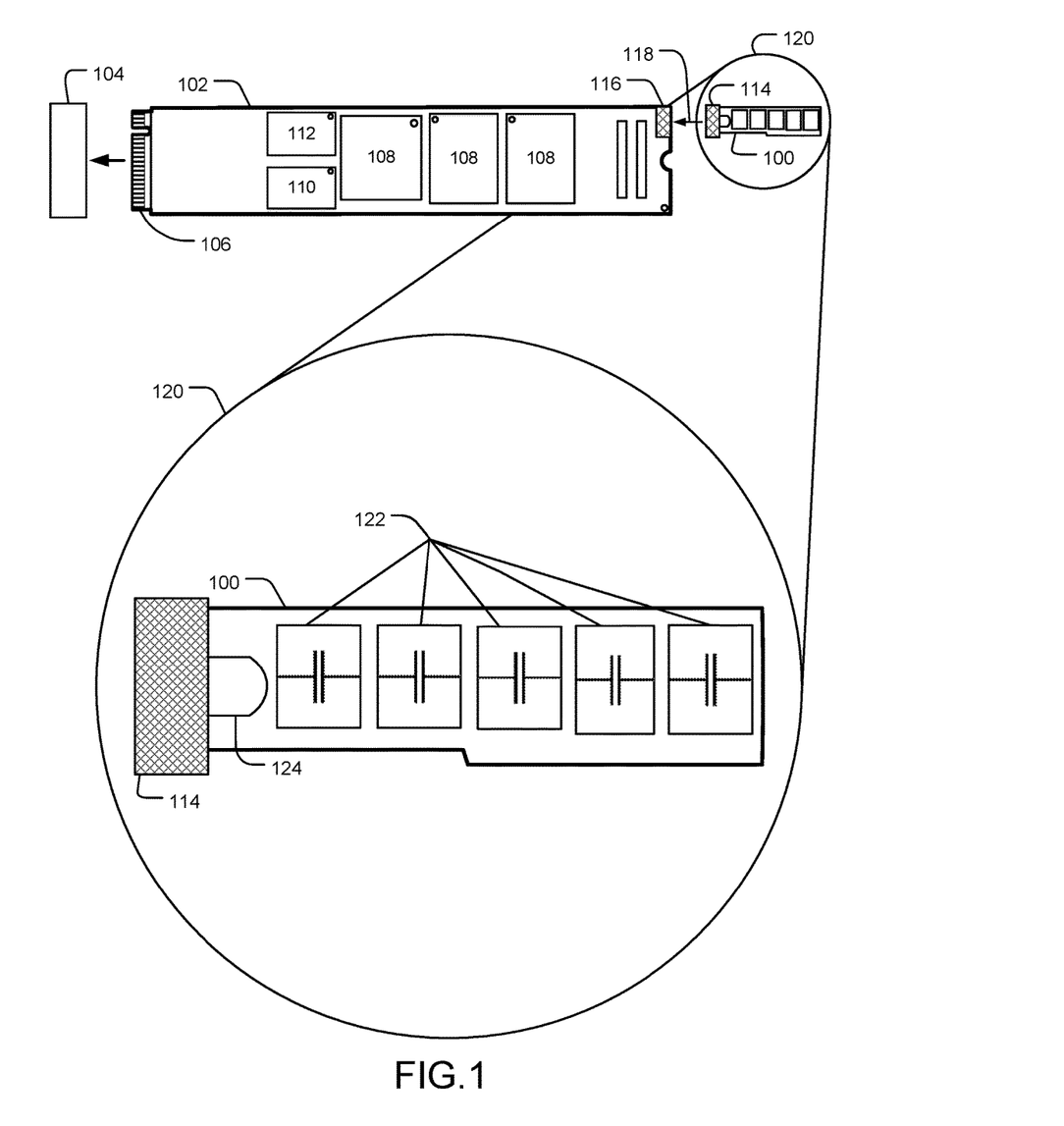
FIG. 1 is a schematic diagram of an example removable power loss protection module inserted into a carrier board.

FIG. 1 is a schematic diagram of an example removable power loss protection module 100 inserted into a carrier board 102. The carrier board 102 may be a printed circuit board for use in a host computing system. The carrier board 102 may be connected to the host computing system via an expansion bus slot 104 and an expansion bus connector 106. The expansion bus connector 106 communicates signals to and from the host computing system and receives a voltage source via expansion bus slot 104. A host computing system may include multiple expansion bus slots for accepting carrier boards via bus connectors such as expansion bus connector 106. Common expansion bus formats that may be used for expansion bus connector 106 include PCI, PCI-X, AGP, ISA, PCI-e, etc. In one implementation, expansion bus connector 106 is a PCI-e bus connector that mates with PCI-e slot 104.

The carrier board 102 may expand on or add features that are not available on the motherboard of the computing system incorporating the carrier board 102. For example, in an enterprise computing environment, it may be desired to increase the solid state storage capacity of a server. Such an expansion may be accomplished by adding one or more carrier boards 102 with on-board memory modules 108 to expansion bus slots 104 in the server. The on-board memory modules 108 may include non-volatile memory modules, such as NAND Flash memory modules and volatile memory such as DRAM memory modules. In an implementation, volatile memory modules serve as a read and/or write cache for holding data received from a host computing system for eventual writing to nonvolatile memory modules.

The carrier board 102 includes control circuitry 110 for managing the connection with a removable power loss protection module 100. In an implementation, the control circuitry 110 may include an E-Fuse. The E-Fuse may be electrically connected to the expansion bus connector 106 and receives a voltage source supplied by the host computing system incorporating the carrier board 102. If the computer system incorporating the carrier board 102 fails to supply a voltage to the carrier board 102, or if the voltage supplied by the computer system incorporating the carrier board 102 satisfies a power failure condition, the E-Fuse may "blow," thus reprogramming one or more other components of the carrier board 102. For example, if the voltage supplied by the computer system incorporating the carrier board 102 satisfies a power failure condition, the E-Fuse may program a memory controller 112 to begin steps to secure data stored on the carrier board 102 against loss. In the event that the voltage supplied by the host computing system satisfies a power failure condition, the memory controller 112 may complete write operations in progress to the non-volatile memory modules 108, perform write operations on any data cached in volatile memory modules 108, complete migrations of data residing on the memory modules 108 and 108, and/or any other operations needed to prevent the loss of data when power is no longer available from the host computing system.

In an implementation, the voltage supplied by the computing system incorporating the carrier board 102 meets a power failure condition if the voltage departs from a standard voltage by more than a predetermined amount. For example, if the computer system incorporating the carrier board 100 is expected to supply a voltage of +12V, then a voltage of only +10.5V may satisfy a power failure condition.

A removable power loss protection module 100 includes a bus connector 114 that mates with a receptacle 116 on the carrier board 102. The bus connector 114 on the removable power loss protection module 102 interfaces with the receptacle 116 on the carrier board 102 by inserting into the receptacle 116 in the direction indicated by the arrow 118. The bus connector may include without limitation, an I²C bus connector, a 7-pin bus connector, etc. For ease of reference, the removable power loss protection module 100 is shown in greater detail in FIG. 1 in bubble 120.

The removable power loss protection module 100 includes one or more energy storage components 122. In an implementation, the one or more energy storage components 122 include capacitors. In another implementation, the one or more energy storage components 122 include rechargeable batteries. Energy storage components 122 store an electrical charge received via the bus connector 114 from the host computing system incorporating the carrier board 102. The voltage may be supplied to the energy storage components via an E-Fuse in the control circuitry 124. In an implementation, energy storage components 122 include one or more capacitors 118. Energy storage components 122 may include a single capacitor or the capacitors may be divided into groups or "banks" of capacitors. In another implementation, the energy storage components 122 are rechargeable batteries, including without limitation lithium-ion batteries. In an implementation, each capacitor has a capacity of substantially 330 microfarads each, which is sufficient to backup 2 megabytes of data. In another implementation, each capacitor has a capacity of substantially 2 farads each, which is sufficient to provide approximately 200 joules of energy. In yet another implementation, the capacitors are supercapacitors, sufficient to backup 1.5 gigabytes of data. When the voltage source of the host computing system incorporating the carrier board 102 is nominal, the E-fuse permits charging of the energy storage components 122. When the voltage source of the host computing system incorporating the carrier board 102 satisfies a power failure condition, the control circuitry initiates discharge of the energy storage components 122 to power one or more components on the carrier board 102 and/or components on the removable memory module 100. Such discharge of the energy storage components 118 may involve discharging the electrical charge built up on one or more of the energy storage components 118. For example, such discharging of the electrical charge may result in current flowing out of the one or more of the energy storage components 118.

The removable power loss protection module 100 also includes control circuitry 124. The control circuitry 124 may include a variety of individual components. One component that may be included in control circuitry 124 is an energy storage component controller to provide a voltage received from the carrier board 102 to the energy storage components 122. The energy storage component controller may include a voltage regulator to step the voltage received from the carrier board 102 up or down as appropriate for the energy storage components 122. In an implementation, the energy storage components 122 are batteries, and the energy storage component controller detects a charge level and provides a voltage to the batteries as appropriate. The control circuitry 124 may charge and manage the rechargeable batteries with the voltage source provided by the host computing system. For example, the control circuitry 124 may monitor the charge level of the batteries and cycle the batteries when appropriate.

Control circuitry 124 transmits control signals to, and receives control signals from, the carrier board 102 via bus connector 114. Control signals sent to the carrier board 102 by the control circuitry 124 include signals announcing the presence of the power protection module 100, availability of back-up power from the energy storage components 122, the amount of energy the power protection module 100 will be able to provide to the carrier board 102 in the event of a power loss, etc. Control signals received by the control circuitry 124 from the carrier board 102 include a signal identifying whether the carrier board 102 has satisfied a power failure condition, an ambient temperature signal, etc. Control signals sent to the carrier board 102 by the control circuitry 124 may also include information regarding the status of the energy storage components 122. For example, control signals sent to the carrier board 102 by the control circuitry 124 may include the amount of usable energy contained in the energy storage components 122, the health status of the energy storage components 122, etc. Information regarding the health status of the energy storage components 122 may include without limitation, a comparisons of the energy remaining in the modules due to capacitance degradation over time with an energy level required to power the carrier board 102 in the case of a power failure condition. Information regarding the health status of the energy storage components 122 may also include without limitation, a signal indicating whether a single bank failure, such as when N+1 redundancy is required.

Figure 2:
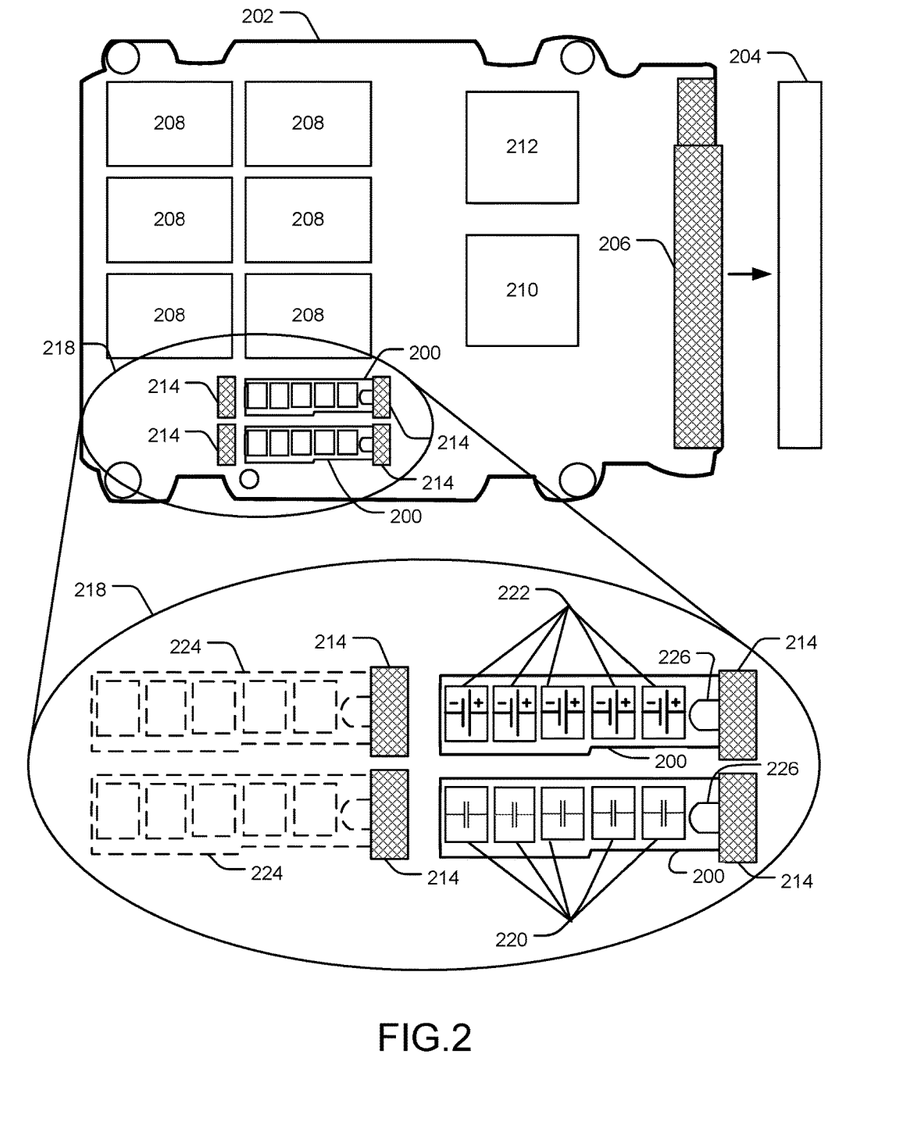
FIG. 2 is a schematic diagram of an example carrier board configured to support multiple example removable power loss protection modules.

FIG. 2 is a schematic diagram of an example carrier board 202 configured to support multiple example removable power loss protection modules 200. The carrier board 202 may be a printed circuit board for use in a host computing system. The carrier board 202 may be connected to the host computing system via an expansion bus slot 204 and an expansion bus connector 206. The expansion bus connector 206 communicates signals to and from the host computing system and receives a voltage source via expansion bus slot 204. A host computing system may include multiple expansion bus slots for accepting carrier board via bus connectors such as expansion bus connector 206. Example carrier board 202 includes on-board memory modules 208. The on-board memory modules 208 may include non-volatile memory modules, such as NAND Flash memory modules and volatile memory such as DRAM memory modules. In an implementation, volatile memory modules serve as a read and/or write cache for holding data received from a host computing system for eventual writing to nonvolatile memory modules.

The carrier board 202 includes control circuitry 210 for managing connections with a removable power loss protection module 200. In an implementation, the control circuitry 210 may include an E-Fuse. The E-Fuse is electrically connected to the expansion bus connector 206 and receives a voltage source supplied by the host computing system incorporating the carrier board 202. If the computer system incorporating the carrier board 202 fails to supply a voltage to the carrier board 202, or if the voltage supplied by the computer system incorporating the carrier board 202 satisfies a power failure condition, the E-Fuse may "blow," thus reprogramming one or more other components of the carrier board 202. For example, if the voltage supplied by the computer system incorporating the carrier board 202 satisfies a power failure condition, the E-Fuse may program a memory controller 212 to begin steps to secure data stored on the carrier board 202 against loss. In the event that the voltage supplied by the host computing system satisfies a power failure condition, the memory controller 212 may complete write operations in progress to non-volatile memory modules in the memory modules 208, perform write operations on any data cached in volatile memory modules of the memory modules 208, complete migrations of data residing on the memory modules 208, and/or any other operations needed to prevent the loss of data when power is no longer available from the host computing system.

In an implementation, the voltage supplied by the computing system incorporating the carrier board 202 meets a power failure condition if the voltage departs from a standard voltage by more than a predetermined amount. For example, if the computer system incorporating the carrier board 202 is expected to supply a voltage of +12V, then a voltage of only +10.5V may satisfy a power failure condition.

In an implementation, the carrier board 202 includes multiple receptacles 214 to mate with bus connectors on removable power loss protection modules 200. The bus connectors on the removable power loss protection modules interface with the receptacles 214 on the carrier board 202 by inserting into the receptacle 214. For ease of reference, the removable power loss protection modules 200 are shown in greater detail in FIG. 2 in bubble 218. Fewer than all receptacles 214 may be occupied by removable power loss protection modules 200. Unoccupied spaces illustrate capacity for adding additional power protection modules 200 on carrier board 202. Locations 224 provide access to receptacles 214 on the carrier board 202 for additional removable power loss protection modules 200.

The removable power loss protection modules 200 include one or more energy storage components. In an implementation, the energy storage components include capacitors 220. In another implementation, the energy storage components include rechargeable batteries 222. The removable power loss protection modules 200 also include control circuitry 226. The control circuitry 226 may include a variety of individual components. One component that may be included in the control circuitry 226 is an energy storage component controller to provide a voltage received from the carrier board 202 to the energy storage components 220 and 222. The energy storage component controller may include a voltage regulator to step the voltage received from the carrier board 202 up or down as appropriate for the energy storage components 220 and 222. In an implementation, the energy storage component controller detects a charge level in rechargeable batteries 222 and provides a voltage to the batteries as appropriate.

Control circuitry 226 transmits control signals to, and receives control signals from, the carrier board 202 via a bus connector. Control signals sent to the carrier board 202 by the control circuitry 226 include signals announcing the presence of the power protection module 200, availability of back-up power from the energy storage components 220 and 222, the amount of energy the power protection module 200 will be able to provide to the carrier board 202 in the event of a power loss, etc. Control signals received by the control circuitry 226 from the carrier board 202 include a signal identifying whether the carrier board 202 has satisfied a power failure condition, an ambient temperature signal, etc.

Energy storage components 220 and 222 store an electrical charge received via the bus connector from the host computing system incorporating the carrier board 202. The voltage may be supplied to the energy storage components via an E-Fuse in the control circuitry 226. In an implementation, energy storage components 220 include one or more capacitors. Energy storage components 220 may include a single capacitor or the capacitors may be divided into groups or "banks" of capacitors. In another implementation, the energy storage components 222 are rechargeable batteries, including without limitation lithium-ion batteries. The control circuitry 226 may charge and manage the rechargeable batteries with the voltage source provided by the host computing system. For example, the control circuitry 226 may monitor the charge level of the batteries and cycle the batteries when appropriate.

Figure 3:
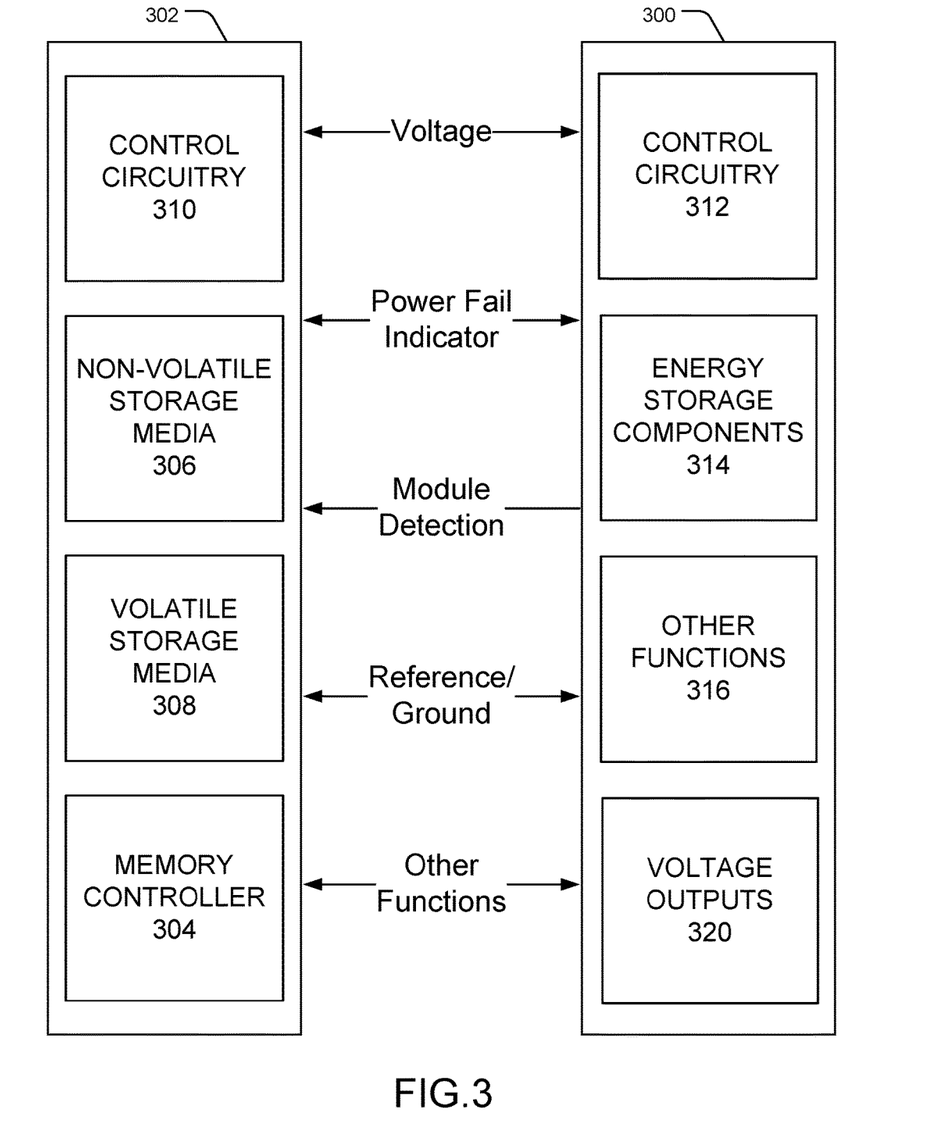
FIG. 3 is block diagram of an example removable power loss protection module in communication with a carrier board.

FIG. 3 is block diagram of an example removable power loss protection module 300 in communication with a carrier board 302. The carrier board 302 includes a memory controller 304 in communication with a host computing system (not shown) via a host interface. In an implementation, the host interface is an expansion computing bus, such as a PCI-e bus. The memory controller 304 supports read and write requests from the host computing system via the host interface. For example, the host computing system may request to read data stored on one of the memory modules on the carrier board 302 such as non-volatile storage media 306 or volatile storage media 308 by reference to one or more logical block addresses by sending a read request to the memory controller 304. The memory controller 304 maps the logical block addresses received from the host computing system to the physical block addresses on the memory modules 306 and 308 and returns the requested data to the host computing system via the host interface. Similarly, the host computing system may request to write data to one or more logical block addresses on the memory modules 306 and 308 by sending a write request to the memory controller 304. The memory controller 304 receives the data to be written from the host computing system via the host interface and writes the data to physical blocks on the memory modules 306 and 308 corresponding to the logical block addresses received from the host computing system.

In an implementation, the volatile storage media 308 is a write cache for data to be written to the non-volatile storage media 306 and/or a read cache for data to be returned to the host. In the event of an unexpected power loss, any data residing on the volatile storage media 308 may be lost if it is not written to the non-volatile storage media 306 before the carrier board 302 loses power. Accordingly, the control circuitry 310 includes a power failure module configured to take actions to prevent the loss of data in the event of an unexpected power loss by the carrier board 302 and/or the host computing system. When the memory controller 304 receives a signal that a power failure condition has been satisfied, such as a signal from control circuitry 310, the memory controller completes any write operations that are in progress at the time the power failure condition signal was received. The memory controller 304 may further perform write operations to the non-volatile storage media 306 of any data that is resident in the volatile storage media 308 at the time the power failure condition signal was received. The memory controller 304 may further perform any operations that may be necessary to secure the data on the memory modules 306 and 308, such as completion of garbage collection operations on the memory modules 306 and 308 or migration of data on memory modules 306 and 308, etc.

The removable power loss protection module 300 and the carrier board 302 communicate control signals and a voltage between one another as indicated by the arrows in FIG. 3. The removable power loss protection module 300 and the carrier board 302 communicate a voltage between each other over a bus connection. When a voltage source is available to the carrier board 302, such as from a host computing system, the carrier board 302 communicates the voltage to the removable power loss protection module 300. In an implementation, the control circuitry 310 on the carrier board 302 includes a voltage regulator to step the voltage up or down before transmission to the removable power loss protection module 300. A voltage source communicated from the carrier board 302 to the removable power loss protection module 300 may be handled by the control circuitry 312 on the removable power loss protection module 300.

The control circuitry 310 on the carrier board 302 also communicates a power failure condition indication signal to the removable power loss protection module 300. In one implementation, a reset circuit on the control circuitry 312 on the removable power loss protection module 300 periodically checks the carrier board 302 for power. If the reset circuit on the control circuitry 312 does not detect power on the carrier board 300, then that is interpreted as a signal from the carrier board 302 that a power failure condition has been satisfied. In another implementation, the control circuitry 310 on the carrier board 302 transmits a signal to the removable power loss protection module 300, such as for example, via the bus connection, that a power failure condition has been satisfied. The carrier board 302 may require a voltage source to complete the signaling of the satisfaction of a power failure condition, such as when the voltage supplied by the host computing system exceeds or is below a voltage threshold needed for the carrier board 302 and the components thereon to function properly.

The control circuitry 310 on the carrier board 302 receives a module detection signal from the removable power loss protection module 300. In an implementation, the control circuitry 312 on the removable power loss protection module 300 transmits a signal to the control circuitry 310 on the carrier board 302 via a bus connection such that the carrier board 302 detects the presence and availability of the removable power loss protection module 300. When the carrier board 302 receives a signal that a removable power loss protection module is available, it may be necessary for the carrier board 302 to download software and/or firmware from the removable power loss protection module 300 to switch the carrier board into an enterprise data mode wherein appropriate steps will be taken to utilize the power protection capabilities of the removable power loss protection module 300 in the case of a power failure to secure data on the carrier board 302. In an implementation, the signal transmitted from the removable power loss protection module 300 includes additional information regarding the capabilities and/or resources of the removable power loss protection module 300, including without limitation: the amount of energy the removable power loss protection module 300 is capable of storing; the amount of energy the removable power loss protection module 300 is able to provide to the carrier board 300, which may be less than the total amount of energy the removable power loss protection module is capable of storing because the removable power loss protection module 300 may be supporting carrier boards in addition to carrier board 302, among which the stored energy may be divided; information regarding the voltage the removable power loss protection module 300 requires to charge the energy storage components 314, such as voltage and/or current requirements; and additional information regarding the removable power loss protection module, such as hardware and/or firmware versions, time since last reboot, total duty hours, and time estimate of the end of life of the removable power loss protection module 300.

The chassis or ground plane of the carrier board 302 may further provide an electrical ground or reference signal to the removable power loss protection module 300. The electrical ground may be communicated to the removable power loss protection module 300 via a bus connector. The removable power loss protection module 302 may provide additional services or features to the carrier board 302. Shown as other functions module 316 in FIG. 3, these may include sensing of environmental conditions surrounding the removable power loss protection module 300 including without limitation temperature, humidity, vibration, magnetic fields, etc. Sensors measuring environmental conditions may be mounted on the removable power loss protection module 300 and communicated by the other functions module 316 to the carrier board 302 via a bus connection. As a non-limiting example, other functions 316 may provide product details regarding the removable power loss protection module 300 to the carrier board 302 such as configuration data, energy storage capacity, software and/or firmware versions, hardware revision number, etc.

As noted above, the removable power loss protection module 300 includes control circuitry 312. The control circuitry 312 is configured to provide the communications with the carrier board 302 shown in FIG. 3. The control circuitry further manages and controls the energy storage components 314. In an implementation, the removable power loss protection module 300 supports multiple carrier boards 302, wherein the control circuitry 312 manages communications with each of the carrier boards 302. The control circuitry 312 may monitor the power status of each carrier board 302, and communicate a voltage to each carrier board 302 that satisfies a power failure condition. In an implementation wherein the energy storage components 314 are rechargeable batteries, the control circuitry 312 may power cycle the rechargeable batteries as needed. The removable power loss protection module 300 also includes voltage outputs 320. In an implementation, the voltage outputs 320 include a bus connector connected to the carrier board 302. If the power loss protection module 300 receives a signal that the carrier board 302 satisfies a power failure condition, then the power loss protection module 300 may communicate a voltage to the carrier board 302 from the energy storage components 314 via the bus connector. In another implementation, the voltage outputs 320 include power cables connected to multiple carrier boards installed in a host computing system. In this implementation, the control circuitry 312 manages communications with the multiple carrier boards installed in the host computing system, and the voltage outputs 320 communicate a voltage of the multiple carrier boards via an electrical cable connection if the multiple carrier boards satisfy a power failure condition.

Figure 4:
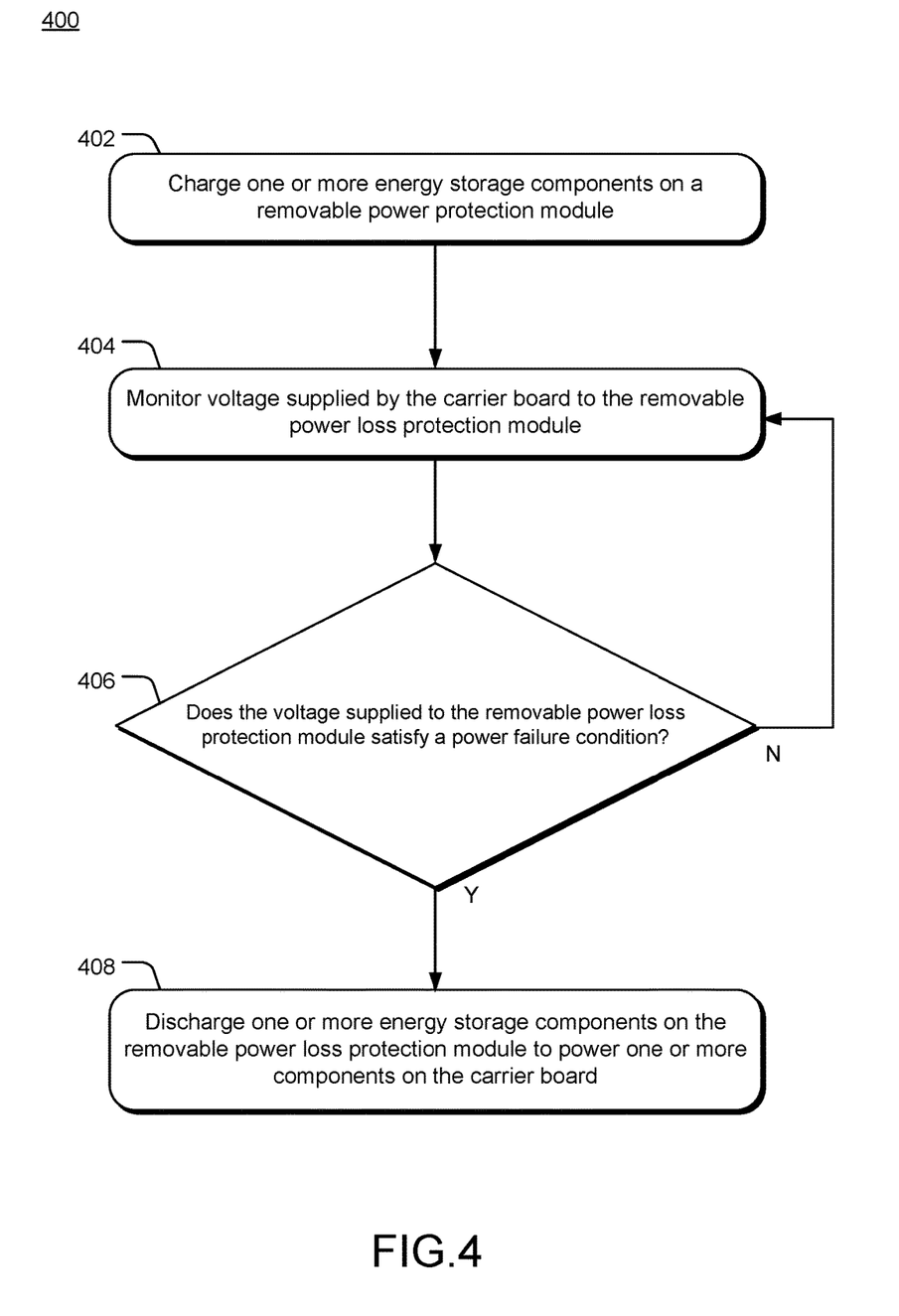
FIG. 4 illustrates example operations for power protecting a carrier board in the event of a power failure with a removable power loss protection module.

FIG. 4 illustrates example operations 400 for providing backup power to a carrier board with a removable power loss protection module in the event the carrier board satisfies a power loss condition. Operation 402 is charge one or more energy storage components. The one or more energy storage components may include rechargeable batteries and/or capacitors. In an implementation, the energy storage components include supercapacitors, such as capacitors formed with electrostatic double-layer capacitance or electrochemical pseudocapacitance or a combination thereof. Operation 402 may be managed by control circuitry on the removable power loss protection module that receives a voltage from a carrier board and/or a power supply of a host computing system.

Operation 404 is monitor voltage supplied to the removable power loss protection module. The voltage supplied to the removable power loss protection module may be received from a carrier board and/or from the power supply of a host computing system. In an implementation, a reset circuit in the control circuitry on the removable power loss protection module monitors the voltage in operation 404. In another implementation, control circuitry on the removable power loss protection module monitors the voltage in operation 404. Decision block 406 is whether the voltage supplied to the removable power loss protection module satisfies a power failure condition. In an implementation, satisfaction of a power failure condition is when the voltage supplied to the removable power loss protection module is substantially zero. In another implementation, the carrier board transmits a signal to the removable power loss protection module if the voltage supplied to the carried board by the host computing system is not zero but satisfies a power failure condition because it is too high, too low, or too inconsistent for the carrier board to function properly. If the voltage supplied to the removable power loss protection module does not satisfy a power failure condition, then execution of the operations 400 returns to operation 404.

Operation 408 is discharge one or more energy storage components on the removable power loss protection loss protection module to power one or more components on the carrier board. The control circuitry on the removable power loss protection module initiates discharge of the energy stored in the energy storage components on the removable power loss protection module. In an implementation, operation 408 continues until the energy in the energy storage components in exhausted. Such discharge of the energy storage components may involve discharging the electrical charge built up on one or more of the energy storage components. For example, such discharging of the electrical charge may result in current flowing out of the one or more of the energy storage components.

Figure 5:
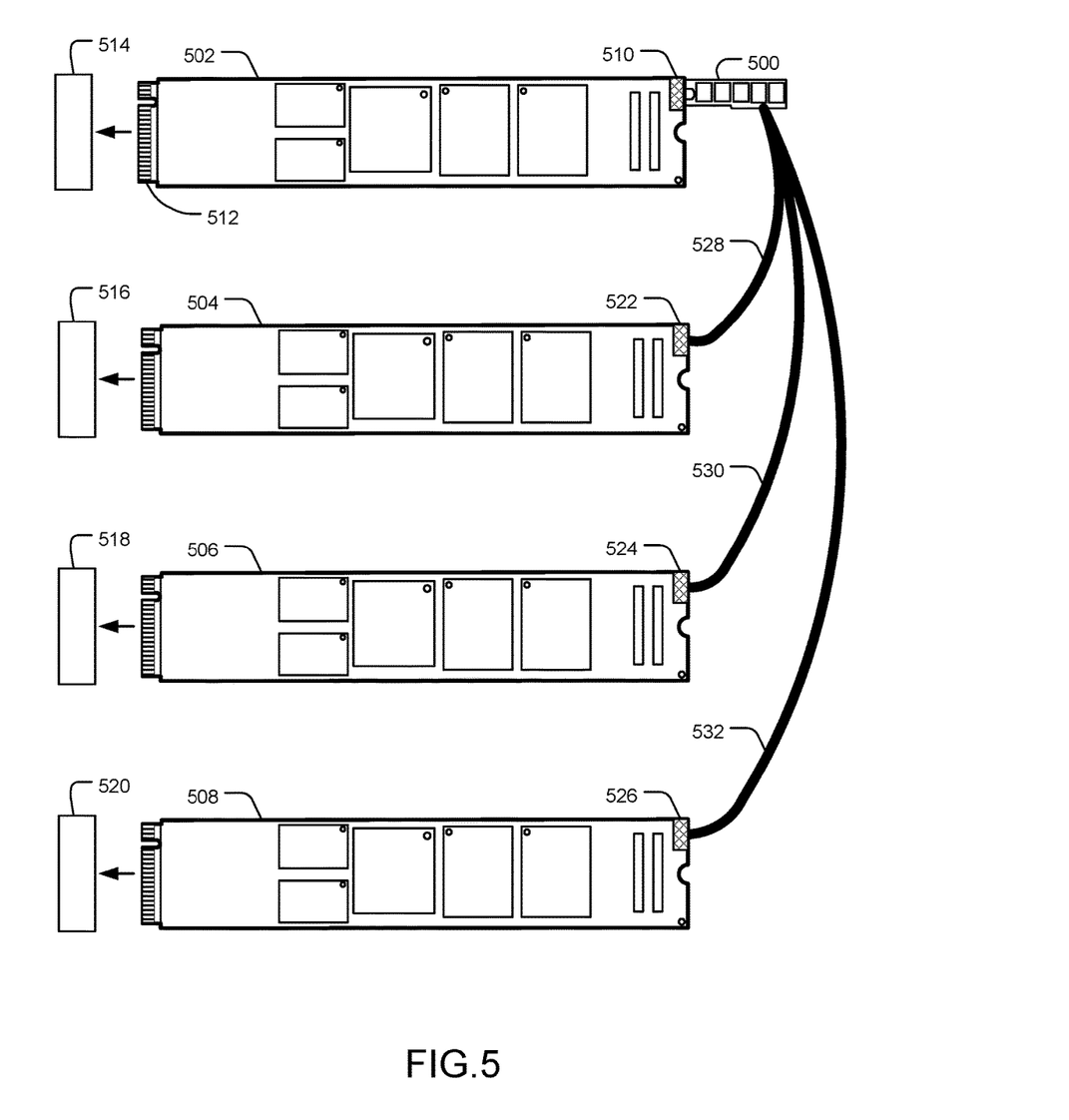
FIG. 5 is a schematic diagram of an example removable power loss protection module inserted into a carrier board and providing power loss protection to multiple carrier boards.

FIG. 5 is a schematic diagram of an example removable power loss protection module 500 inserted into a carrier board 502 and providing power loss protection to multiple carrier boards 504, 506, and 508. The removable power loss protection module 500 is inserted into a bus connector 510 on carrier board 502. In an implementation, the carrier board 502 supplies a voltage to the removable power loss protection module 500 to charge energy storage components located thereon. The carrier board 502 receives a voltage from a computing system incorporating the carrier boards 502, 504, 506, and 508 via an expansion bus slot 514. Carrier boards 504, 506, 508 are similarly inserted into expansion bus slots 516, 518, and 520.

The removable power loss protection module 500 is electrically connected to bus slots 522, 524, and 526 on carrier boards 504, 506, and 508, respectively, via electrical cables 528, 530, and 532. The electrical cables 528, 530, and 532 may communicate control signals and a voltage between the carrier boards 504, 506, and 508 via the electrical cables 528, 530, and 532. One of the control signals that may be communicated via electrical cables 528, 530, and 532 is whether a carrier board satisfies a power failure condition. If one or more of the carrier boards 502, 504, 506, or 508 does satisfy a power failure condition, then the removable power loss protection module 500 may supply a voltage to that carrier board via the electrical cables 528, 530, and 532.

The implementations described herein are implemented as logical operations in one or more computer systems. The logical operations may be implemented (1) as a sequence of processor-implemented operations executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A computing system comprising:
   a carrier board including:
      an expansion bus connector configured to mate with a bus slot in the computing system; and
      one or more data storage media;
   a removable power loss protection module including:
      a bus connector configured to mate with a receptacle on the carrier board, the bus connector further configured to receive a voltage supplied to the removable power loss protection module from the carrier board;
      one or more energy storage components; and
      control circuitry configured to electrically charge the one or more energy storage components with the received voltage, the control circuitry further configured to initiate electrical discharge of the one or more energy storage components to provide power to the carrier board if the received voltage satisfies a power failure condition.

2. The computing system of claim 1, wherein the energy storage components are electrical capacitors.

3. The computing system of claim 1, wherein the energy storage components are rechargeable batteries.

4. The computing system of claim 2, wherein the electrical capacitors are supercapacitors.

5. The computing system of claim 1, wherein the control circuitry is further configured to initiate electrical discharge of the one or more energy storage components to power at least one other carrier board if the supplied voltage satisfies the power failure condition.

6. The computing system of claim 5, wherein the power loss protection module is electrically connected to the at least one other carrier board via a one-to-many electrical cable.

7. A method for power protecting a carrier board within a computing system, the method comprising:
  powering the carrier board including one or more data storage media via an expansion bus connector configured to mate with a bus slot in the computing system;
  charging one or more energy storage components mounted on a removable power loss protection module, the removable power loss protection module including a bus connector configured to receive a voltage supplied to the removable power loss protection module from the carrier board;
  monitoring the voltage supplied to the removable power loss protection module from the carrier board for satisfaction of a power failure condition;
  discharging at least one of the one or more energy storage components to power one or more components on the carrier board if the supplied voltage satisfies the power fail condition; and
  completing data write operations in progress to the one or more data storage media after the supplied voltage satisfies the power fail condition.

8. The method of claim 7, wherein the one or more energy storage components includes a capacitor.

9. The method of claim 7, wherein the one or more energy storage components includes a rechargeable battery.

10. The method of claim 7, wherein the one or more energy storage components includes a supercapacitor.

11. The method of claim 7, wherein the one or more energy storage components are electrically connected to the another carrier board via an electrical cable connection.

12. The method of claim 7, wherein the one or more data storage media includes a volatile memory read cache, and wherein completing the data write operations in progress includes writing data cached in the volatile memory read cache to the one or more data storage media.

13. The method of claim 7, further comprising:
  discharging at least one of the one or more energy storage components to power one or more components on at least one other carrier board if the supplied voltage satisfies the power fail condition.

14. The method of claim 13, wherein the one or more components on the at least one other carrier board are powered via an electrical cable connection.

15. The method of claim 7, wherein the monitoring operation is performed by control circuitry on the removable power loss protection module.

16. The method of claim 7, further comprising:
  completing data write operations on data cached in a volatile storage media to the non-volatile data storage media after the supplied voltage satisfies the power fail condition.

17. A computing system comprising:
  a carrier board configured to communicate data with the computing system, the carrier board further configured to receive a voltage supplied from the computing system, the carrier board including:
    one or more data storage media;
    one or more receptacles; and
    a memory controller;
  a removable power loss protection module including:
    one or more energy storage components, wherein one of the receptacles is configured to mate to a bus connector on the removable power loss protection module, and wherein the bus connector is further configured to receive a voltage supplied from the carrier board to the removable power loss protection module;
    control circuitry configured to:
      monitor the voltage supplied from the computing system;
      notify the memory controller if the voltage supplied from the computing system satisfies a power failure condition; and
      supply power to one or more components on the carrier board with power from the removable power loss protection module if the voltage supplied from the computing system satisfies the power failure condition, wherein the memory controller is configured to detect the presence of the removable power loss protection module, and the memory controller is further configured to secure data on the one or more data storage media if the voltage supplied from the computing system satisfies the power failure condition and the removable power loss protection module is present.

18. The system of claim 17, wherein the memory controller is further configured to secure data on the one or more data storage media by completing write operations in progress at the time when the voltage supplied from the computing system satisfies the power failure condition.

19. The system of claim 17, wherein the one or more data storage media includes a volatile memory read cache, and wherein the memory controller is further configured to secure data on the one or more data storage media by writing data cached in the volatile memory read cache to the one or more data storage media at the time when the voltage from the computing system satisfies the power failure condition.

20. The system of claim 17, wherein the control circuitry is further configured to communicate information about status of the one or more components on the removable power loss protection module to the carrier board.

* * * * *